United States Patent [19]

Grabinski et al.

[11] Patent Number: 4,979,694
[45] Date of Patent: Dec. 25, 1990

[54] TENSIONING MECHANISM FOR A SAFETY BELT REEL-IN MECHANISM

[75] Inventors: Michael Grabinski, Hamburg; Thomas Schmidt, Timmendorfer Strand, both of Fed. Rep. of Germany

[73] Assignee: Autoflug GmbH & Co. Fahrzeugtechnik, Rellingen

[21] Appl. No.: 375,415

[22] Filed: Jun. 30, 1989

[30] Foreign Application Priority Data

Jun. 30, 1988 [DE] Fed. Rep. of Germany ....... 3822094
Mar. 2, 1989 [DE] Fed. Rep. of Germany ....... 3906693

[51] Int. Cl.$^5$ ............................................. B60R 22/46
[52] U.S. Cl. .................................................... 242/107
[58] Field of Search ......... 242/107, 107.4 R, 107.4 A; 280/806; 297/478, 480

[56] References Cited

U.S. PATENT DOCUMENTS 4,423,846 1/1984 Fohl ..................................... 242/107
4,618,108 10/1986 Butenop et al. ..................... 242/107
4,750,685 6/1988 Frei ..................................... 242/107

Primary Examiner—John M. Jillions
Attorney, Agent, or Firm—Robert W. Becker & Associates

[57] ABSTRACT

A tensioning mechanism for a safety belt reel-in mechanism, including a cable drive that is activatable in the event of a crash and includes a cable pulley that is adapted to be positively coupled with the belt reeling-in shaft of the reel-in mechanism via a locking member that is disposed on the cable pulley and is radially shiftable for meshing with coupling teeth provided on a toothed ring of the belt reeling-in shaft. To assure a more reliable tooth engagement in every phase of the tensioning movement, the cable pulley is provided with a support arrangement that is adapted to rest against the tooth ring of the belt reel-in mechanism and that extends into a plane formed by the locking member and the coupling teeth.

7 Claims, 2 Drawing Sheets

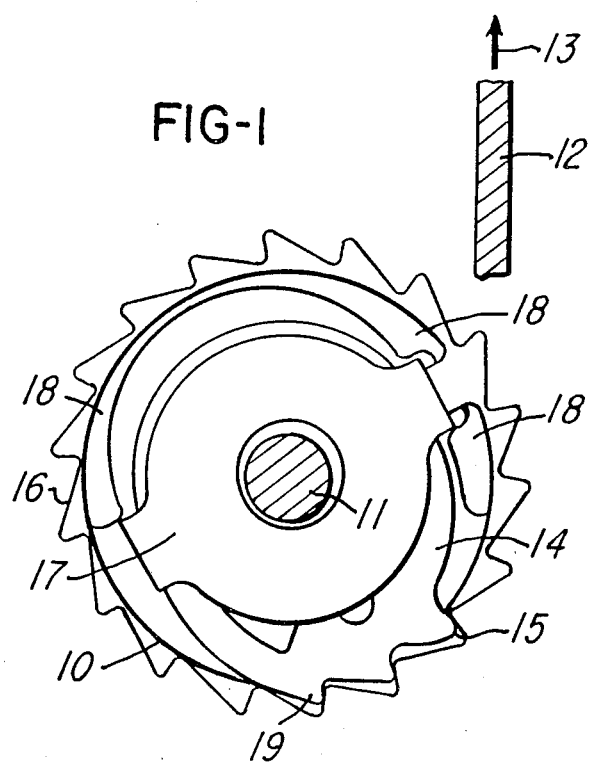
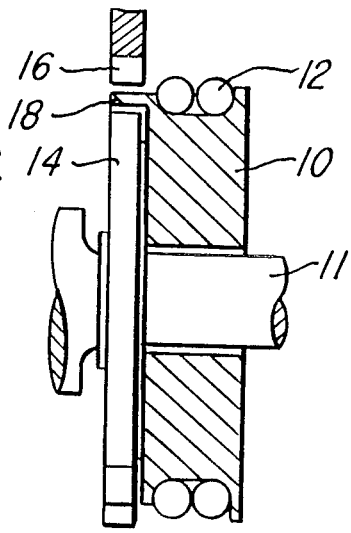

TENSIONING MECHANISM FOR A SAFETY BELT REEL-IN MECHANISM

BACKGROUND OF THE INVENTION

The present invention relates to a tensioning mechanism for a safety belt reel-in mechanism, including a cable drive that is activatable in the event of a crash and includes a cable pulley that is adapted to be positively coupled with the belt reeling-in shaft of the reel-in mechanism via a locking member that is disposed on the cable pulley and is radially shiftable for engaging or meshing with coupling teeth provided on a toothed ring of the belt reeling-in shaft.

A tensioning mechanism of this general type is disclosed in U.S. Pat. No. 4,618,108, Butenop et al, issued Oct. 21, 1986. This known mechanism provides a locking member that is axially held on the cable pulley in an eccentrically mounted manner, and in the event of activation can be deflected radially against the force of a spring that loads the locking member in its rest position. When shifted radially, this locking member meshes via teeth in coupling teeth that are coupled with the reeling-in shaft of the belt reel-in mechanism and that extend about the cable pulley in the plane of the locking member that is mounted thereon, thereby producing a positive connection between the cable pulley and the belt reeling-in shaft of the belt reel-in mechanism. The mounting and mass ratios on the locking member are such that if the locking member is activated, the locking member lags behind the rotational movement of the cable pulley due to its inherent mass moment of inertia, and, due to its eccentric mounting, pivots radially outwardly. In so doing, the looking member is held in the plane of the coupling teeth by a spring that urges the locking member axially against the cable pulley, so that the cable pulley and the locking member that is pivotably mounted thereon are to be viewed as a functional unit.

Such a design of the coupling connection between the tensioning mechanism and the belt reel-in mechanism has the drawback that the teeth of the locking member turn at least partially out of the coupling teeth due to the mounting play that is unavoidable with regard to mounting of the cable pulley on a shaft journal or extension of the belt reeling-in shaft, and due to the verY high pulling force on the drive cable, which is related to acceleration and is particularly effective at the beginning of the tensioning movement directly after engagement or meshing of the teeth. As a result, the positive connection between the cable pulley and the belt reeling-in shaft that is initiated at the beginning of the tensioning movement under certain circumstances is again disengaged over the duration of the tensioning process.

With regard to mounting the cable pulley, together with the locking member that is disposed and held thereon, on the shaft extension of the belt reeling-in shaft, a free movement space for the cable pulley cannot be avoided in the event of load, with this space being composed of the bearing play proper, a certain flexibility of the shaft extension that is exhibited during loading, as well as a likewise occurring flexibility of the locking member teeth on the one hand as well as the coupling teeth on the other hand; added to this is a pitching moment or maximum torque of the cable pulley about the shaft extension, which is brought about by the fact that the line of application of the pulling force that acts on the drive cable, and the effective plane of the positively intermeshing teeth, are spaced from one another by a distance that manifests itself as a lever arm.

As a result of these influences, after an initially effected engagement of the locking member teeth in the coupling teeth, a torque occurs that preferably acts about that engagement tooth that is disposed at the greatest distance from the line of application of the cable-pulling force, and that, starting with that engagement tooth that is disposed the closest to the line of application of the cable-pulling force, turns the teeth of the locking member out of engagement with the coupling teeth, whereby the cable pulley yields to this torque, by deflecting, as a result of the aforementioned free movement space, so that the teeth of the locking member and the belt reeling-in shaft ultimately disengage.

It is therefore an object of the present invention to improve a tensioning mechanism of the aforementioned general type in such a way that a more reliable engagement of the teeth of the locking member and the coupling teeth of the belt reeling-in shaft is assured during every phase of the tensioning movement.

BRIEF DESCRIPTION OF THE DRAWINGS

This object, and other objects and advantages of the present invention, will appear more clearly from the following specification in conjunction with the accompanying schematic drawings, in which:

FIG. 1 is a view of the system side of one exemplary embodiment of the present invention and shows a cable pulley with a locking member and coupling teeth in the locking position;

FIG. 2 is a longitudinal cross-sectional view of the arrangement of FIG. 1;

SUMMARY OF THE INVENTION

Figure 3:
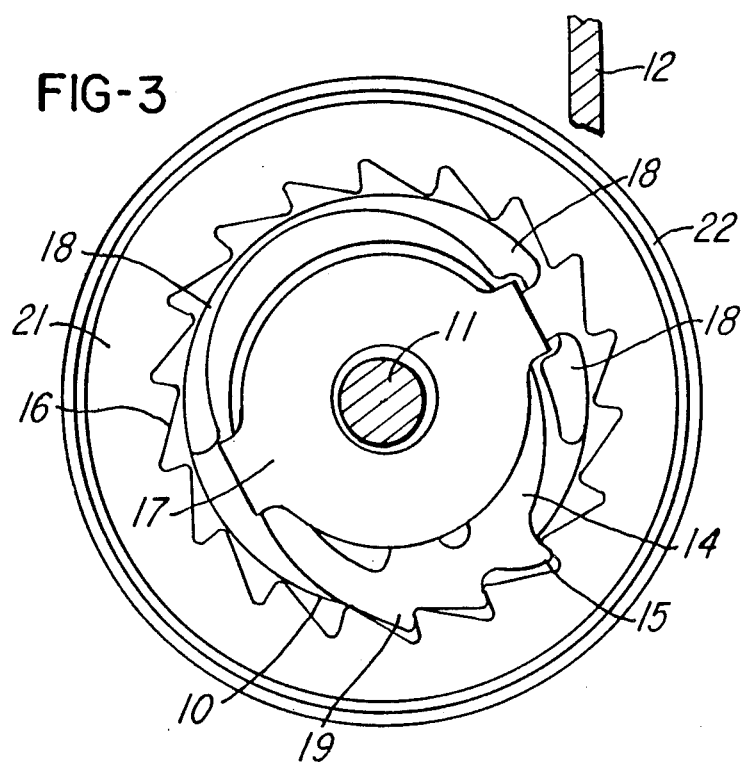
FIG. 3 is a view similar to that of FIG. 1 of another exemplary embodiment of the inventive tensioning mechanism.

The tensioning mechanism of the present invention is characterized primarily in that the cable pulley is provided with support means that is adapted to rest against the toothed ring and that extends into a plane formed by the locking member and the coupling teeth.

Due to the support means that is inventively provided on the cable pulley and that extends into the plane formed by the locking member and the coupling teeth, a support force that acts toward the support of the cable pulley in the region of the coupling teeth is now directed against the torque that acts upon the teeth, so that the cable pulley is radially fixed in its position relative to the cable teeth and does not yield to the torque that acts from the cable-pulling force upon the teeth, so that a more reliable tooth engagement is also assured as the tensioning movement proceeds. The inventive support of the cable pulley against the toothed ring that has the coupling teeth moreover reduces the pitching moment that acts upon the unit, so that the entire coupling and locking system is considerably stabilized.

Pursuant to a first specific embodiment of the present invention, a flange is provided that is disposed on the cable pulley, extends axially therefrom, and extends in a cup-like manner about the outer periphery of the toothed ring, so that a pitching moment that might possibly be present is absorbed by the positive support between the outer edge of the pressure ring and the extending flange of the cable pulley that extends about this edge.

Pursuant to a second specific embodiment of the present invention, a support that extends from the cable pulley is disposed between the locking member and the coupling teeth, and is supported on the inner side of the toothed ring teeth in the event that a pitching moment becomes effective. In this connection, the present invention can be advantageously realized if the thickness of the material of the support as measured in the radial direction increases toward that region that rests against the coupling teeth in the locking position. Pursuant to a further advantageous feature of the present invention, the distance by which the support extends from the plane of the cable pulley corresponds to the thickness of the material of the locking member.

Pursuant to one advantageous configuration for the support of a further specific embodiment of the present invention, the support, in the rest position of the locking member, confines the locking member with the exception of a portion that permits the locking member to pass radially beyond the contour of the cable pulley. In such a case, the inner surface of the support that extends from the cable pulley could also be utilized to guide the locking member during its radial deflection.

In addition to the alternative embodiments of an outer and an inner support, the present invention also extends to the possibility of disposing both supports next to one another, resulting in a double support and stabilization of the coupling system.

Further specific features of the present invention will be described in detail subsequently.

DESCRIPTION OF PREFERRED EMBODIMENTS

Referring now to the drawings in detail, FIG. 1 illustrates a cable pulley 10 that is rotatably mounted on a shaft journal or extension 11 of a belt reeling-in shaft of a non-illustrated belt reel-in mechanism. Wound on the cable pulley 10 is a drive cable 12 that in the event of a crash is unwound from the cable pulley 10 with a cable-pulling force that acts in the direction of the arrow 13.

Eccentrically mounted on the cable pulley 10 is a locking member 14 that in the position illustrated in FIG. 1 is shifted radially outwardly. Peripheral or outer teeth 15 of the locking member 14 mesh with a toothed coupling member 16 that is disposed on the belt reeling-in shaft and surrounds the locking member 14 in a ring-shaped manner in the plane of the locking member. The locking member 14 is furthermore axially held and secured on the cable pulley 10 via a spring 17 that overlaps the locking member 14.

On that side opposite the deflection region of the locking member 14, the cable pulley 10 is provided with a flange-like support 18 that extends into the plane of not only the locking member 14 but also of the toothed coupling member 16. The support 18 follows the outer contour of the cable pulley 10 and has a height that corresponds to the thickness of the material of the locking member 14. The thickness of the material of the support flange 18 varies in the radial direction. In particular, the thickness of the material of the support 18 increases toward that region of the cable pulley 10 that is relied upon for support when there is a load. At the same time, due to its configuration, the support 18 confines, in shape, the essentially oval locking member 14 in its rest position where it has entered the cable pulley contour, so that parts of the inner side of the support flange 18 are relied upon during the deflection movement of the locking member 14 for guiding the same.

In the rest position, which is not illustrated in the drawings, the drive cable 12 is wound upon the cable pulley 10, and the locking member 14 rests against the support flange 18 within the contour of the cable pulley 10.

If there is now a crash and the cable 12 is unwound from the cable pulley 10, the locking member 14 is shifted radially outwardly until the outer teeth 15 of the locking member 14 mesh with the coupling teeth 16. After the teeth 15, 16 mesh with one another, and the resulting effect of a torque that results from the cable-pulling force, especially about the tooth 19, has set in, the cable pulley 10 shifts, accompanied by a partial compensation of a structural and manufacturing-related free movement space, until the support 18 of the cable pulley 10 rests against the coupling teeth 16; this radial shifting of the cable pulley 10 is so slight, due to the close encircling on the part of the coupling teeth 16, that taking into consideration the play between the locking member 14 and the cable pulley 10, the meshing of the teeth 15 of the locking member and the coupling teeth 16 is not affected. Due to the thus effective support forces, the teeth 15 of the locking member 14 cannot turn out of the coupling teeth 16, thus assuring a reliable meshing of teeth.

FIG. 3 illustrates an embodiment of the present invention where in addition to the support 18 previously described, a further support is provided in the form of a flange 22 that extends axially from the cable pulley 10 and extends in a cup-like manner about the outer periphery of a toothed ring 21 that is connected with the belt reeling-in shaft. Since the diameter of the cable pulley 10 is less than the outer diameter of the toothed ring 21, the projecting flange 22 is formed on the outer end of a step-like extension 23 of the cable pulley 10. Due to the tight embracing, in the event of a pitching moment or maximum torque, the cable pulley 10 is supported via the flange 22 against the toothed ring 21, so that the stability of the coupling connection can continue to be provided.

Figure 4:
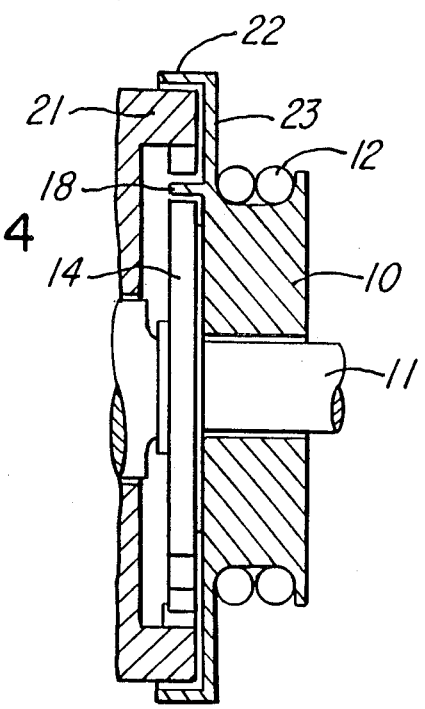
FIG. 4 is a longitudinal cross-sectional view of the arrangement of FIG. 3.

In the embodiment illustrated in FIGS. 3 and 4, both of the supports, namely in the form of the outer flange 22 as well as the inner flange 18, are combined with one another; however, it is to be understood that the present invention also extends to the situation of alternatively providing only one of the two supports shown in FIGS. 3 and 4.

The present invention is, of course, in no way restricted to the specific disclosure of the specification and drawings, but also encompasses any modifications within the scope of the appended claims.

What we claim is:

1. In a tensioning mechanism for a safety belt reel-in mechanism, including a cable drive that is activatable in the event of a crash and includes a cable pulley that is adapted to be positively coupled with the belt reeling-in shaft of said reel-in mechanism via a locking member that is disposed on said cable pulley and is radially shiftable for meshing with coupling teeth provided on a toothed ring of said belt reeling-in shaft, the improvement wherein:

said cable pulley is provided with support means that is supportable against said toothed ring and that extends into a plane formed by said locking member and said coupling teeth, whereby said support means include a flange means that extends axially from said cable pulley and extends about an outer periphery of said toothed ring in a cup-like manner, with the diameter of said cable pulley being less than the diameter of said toothed ring, and whereby said cable pulley is provided with a radially extending step-like extension on which is disposed said axially extending support flange means.

2. In a tensioning mechanism for a safety belt reel-in mechanism, including a cable drive that is activatable in the event of a crash and includes a cable pulley that is adapted to be positively coupled with the belt reeling-in shaft of said reel-in mechanism via a locking member that is disposed on said cable pulley and is radially shiftable for meshing with coupling teeth provided on a toothed ring of said belt reeling-in shaft, the improvement wherein:

said cable pulley is provided with support means that is supportable against said toothed ring and that extends into a plane formed by said locking member and said coupling teeth, whereby said support means extends axially from said cable pulley and is disposed between said locking member and said coupling teeth.

3. A tensioning mechanism according to claim 2, in which said support means has a portion that in a locking position of said mechanism rests against said coupling teeth, with the thickness of the material of said support means, as measured in a radial direction, increasing in a direction toward said aforementioned support means portion.

4. A tensioning mechanism according to claim 3, in which said support means extends from the plane of said cable pulley by a distance that corresponds to the thickness of the material of said locking member.

5. A tensioning mechanism according to claim 3, in which said locking member has teeth for effecting said meshing with said coupling teeth in a deflected locking position of said locking member, with said support means being disposed in a region of said cable pulley opposite said teeth of said locking member.

6. A tensioning mechanism according to claim 3, in which, in a rest position of said locking member, said support means confines the shape of said locking member within the contour of said cable pulley with the exception of a clearance required for deflection of said locking member.

7. In a tensioning mechanism for a safety belt reel-in mechanism, including a cable drive that is activatable in the event of a crash and includes a cable pulley that is adapted to be positively coupled with the belt reeling-in shaft of said reel-in mechanism via a locking member that is disposed on said cable pulley and is radially shiftable for meshing with coupling teeth provided on a toothed ring of said belt reeling-in shaft, the improvement wherein:

said cable pulley is provided with support means that is supportable against said toothed ring and that extends into a plane formed by said locking member and said coupling teeth, whereby said support means comprises two separate flange means that are spaced radially apart from one another on said cable pulley.

* * * * *